May 14, 1968   C. GRUNFELD   3,383,127
SPLIT BRACKET

Filed Feb. 13, 1967   4 Sheets-Sheet 1

INVENTOR
CHARLES GRUNFELD
BY Robillard and Byrne
ATTORNEYS

May 14, 1968      C. GRUNFELD      3,383,127

SPLIT BRACKET

Filed Feb. 13, 1967      4 Sheets-Sheet 2

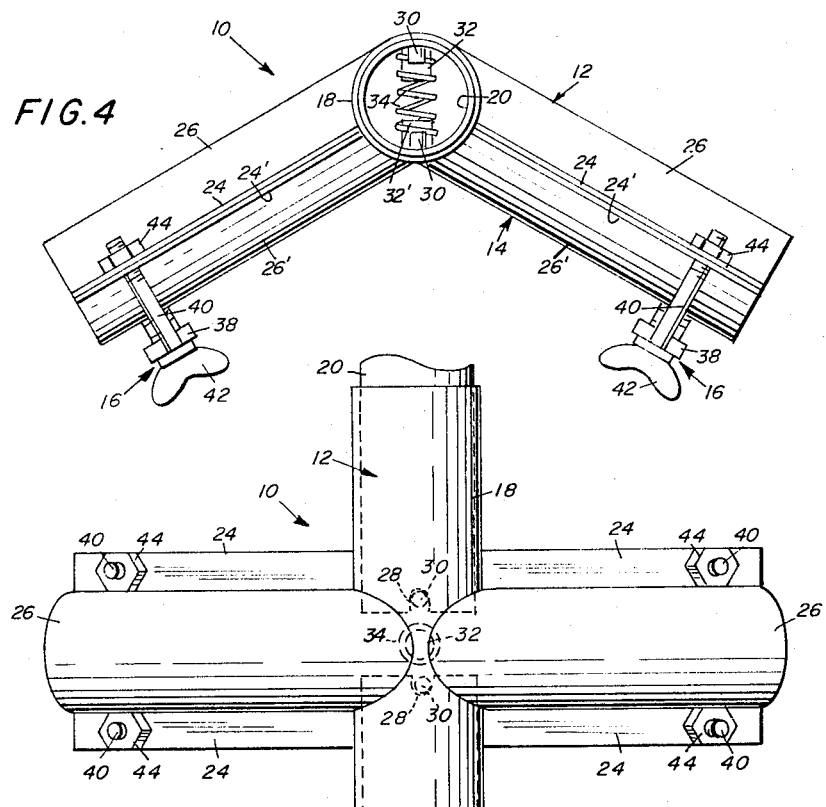
FIG. 4
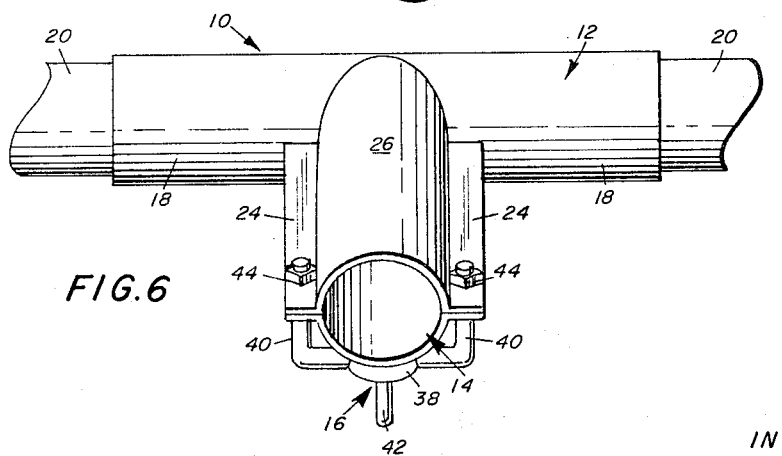
FIG. 5
FIG. 6
INVENTOR
CHARLES GRUNFELD
BY Robillard and Byrne
ATTORNEYS

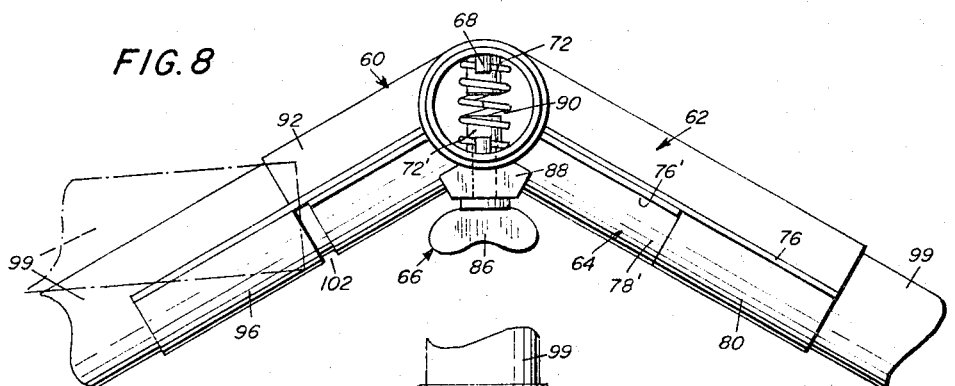
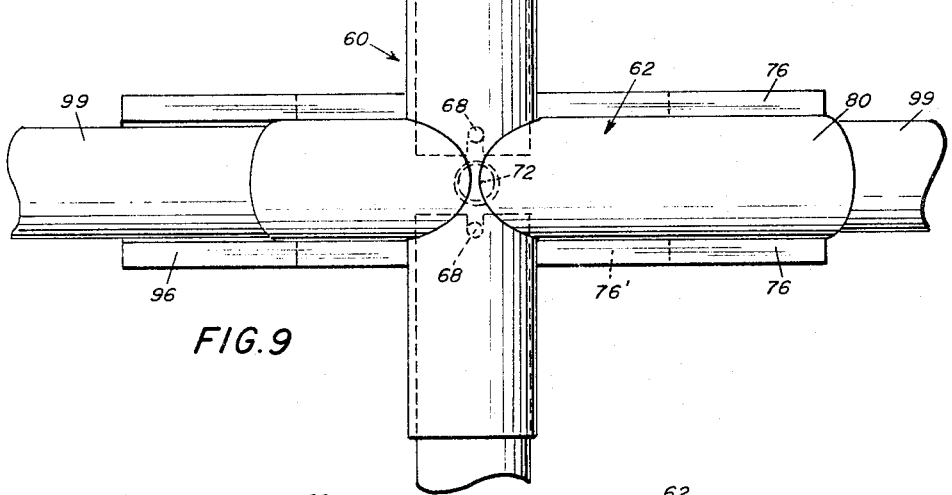
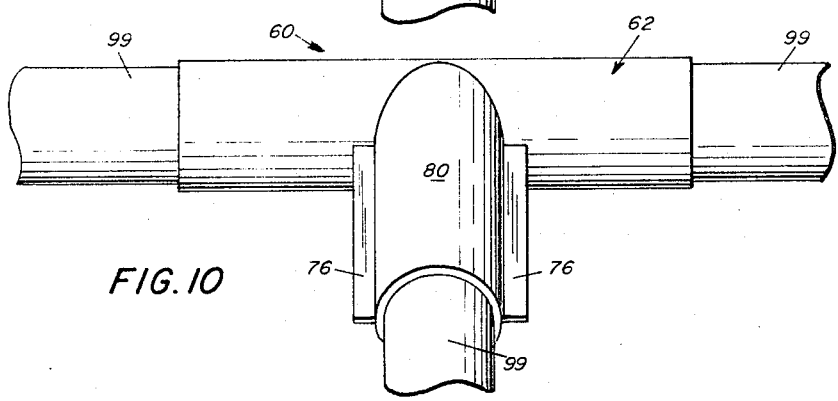

United States Patent Office 3,383,127
Patented May 14, 1968

3,383,127
SPLIT BRACKET
Charles Grunfeld, 32 Corbin Place,
Brooklyn, N.Y. 11235
Filed Feb. 13, 1967, Ser. No. 615,656
6 Claims. (Cl. 287—51)

ABSTRACT OF THE DISCLOSURE

This invention relates to a bracket member of a type having a portion thereof split and mating with its opposing member. The invention secures a plurality of rods through the use of support guides and a clamping member workable independently of the guides.

---

This invention relates to a bracket for supporting a plurality of rods which extends from a common point. The present invention is contemplated for use in supporting rods which themselves are used as a framework for tents, awnings, or other protective coverings which, in order to be practicable, require ease of assembly and disassembly as well as ruggedness and simplicity. The prior art has shown other devices for supporting such a framework but in general they have been too complicated, clumsy and delicate and have required great skill on the part of the operator during assembly. It is a primary object of the invention to provide a bracket in which a plurality of elements may be assembled with a maximum of speed and a minimum of skill.

Another important objective of the invention is to provide a bracket having its principal members biased away from each other to facilitate pole element assembly which together with member design provides means for attaching pole members to the brackets under the most difficult of conditions.

A further objective of the invention is to provide a bracket of the mating-member type with cylindrical extensions for receiving pole members which extensions appreciably add to the rigidity of the combination.

A yet further objective of the invention is to allow the quick and easy assembly without tools of large and varied frameworks such as shelters for exhibits, fairs, dwellings, picnic enclosures and the like.

These and other objects of the invention will become more apparent to those skilled in the art by reference to the following detailed description when viewed in light of the accompanying drawings, wherein:

FIGURE 4 is a side elevational view of the bracket of FIGURE 3 in an assembled configuration;

FIGURE 5 is a plan view of the bracket of FIGURE 3;

FIGURE 6 is an end view of the bracket of FIGURE 3;

FIGURE 8 is a side elevational view of the modified bracket in an assembled configuration;

FIGURE 9 is a plan view of the modified bracket; and

FIGURE 10 is an end view of the modified bracket.

Figure 1:
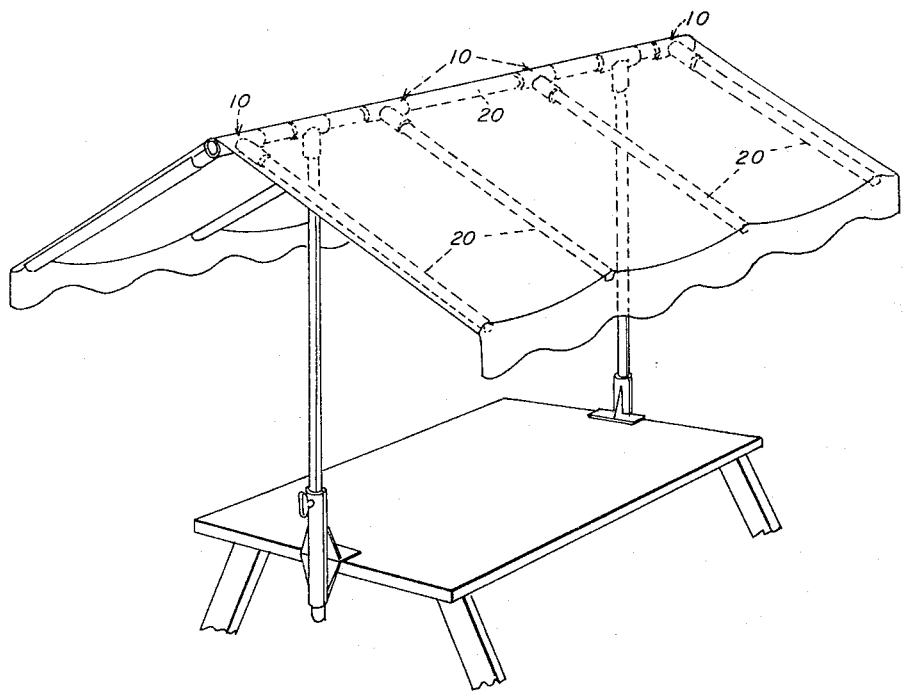
FIGURE 1 is a perspective view showing one form of the invention in use over a picnic table.
Figure 2:
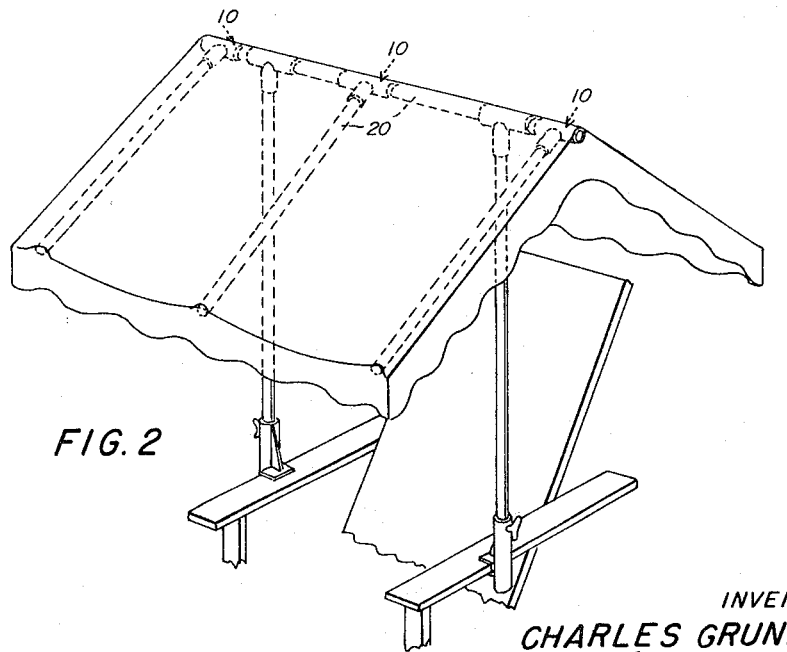
FIGURE 2 is a perspective view showing another form of the invention in use over a chair.

Referring now to the drawings wherein like figures indicates like elements, the numeral 10 indicates the bracket of this invention. The bracket is generally comprised of three elements, a main or tubular member 12, member 14, and a pair of locking assemblies 16.

The member 12 has a tube 18 for its main body portion. Each end of the tube receives a longitudinally aligned pole element such as ridge poles 20 which are commonly used for the support of tents and other protective coverings. The tube 18 has a cut-out portion 22 intermediates its ends. The fit of the pole 20 within the tube 18 is close but need not be tight as the tubular sections on either side of the cut-out portion 22 are utilized as guides and supports but do not have a locking function.

A pair of flanges 24 extend outwardly from opposite sides of the cut-out portion 22 at an angle perpendicular to the longitudinal axis of tube 18. The flanges are flat except for a central groove 26 which receives a pole element as for example the intermediate rib pole in a tent. For an example of a tent, reference is made to my copending application Ser. No. 428,335, now Patent No. 3,303,851. Each flange has a pair of elongated apertures 27 adjacent its outer end. In order to prevent a rotation, the ridge pole 20 is provided with a pair of slots 28 which engage with upstanding lugs 30 on its inner wall of member 12 opposite the cut-out portion 22. Located between the lugs 30 is an ear 32 around which a spring 34 is received tightly.

The complementary member or plate 14 is the mate to the main member 12 and has flanges 24' and grooves 26' which are substantially the mirror image of the flanges 24 and grooves 26. Elongated apertures 27' correspond in location and size to the elongated apertures 27. A central connecting web portion 36 between the flanges 24' is curved to fit the cut-out portion 22. The central web 36 represents a transverse groove which intersects the grooves 26'. The inner wall of web 36 has lugs 30' and an ear 32' opposed to lugs 30 and ear 32 for tightly receiving the other end of spring 34.

In order to clampingly engage the pole elements between the members 12 and 14, a pair of U-shaped locking assemblies 16 are provided. Since the locking assemblies are identical, only one will be described. A bridge 38 having a pair of spaced legs 40 threaded at their ends overlies the outer wall of groove 26' on the member 14 and has its legs 40 inserted through the apertures 27 and 27'. The bridge has a central threaded opening in which a wing screw 42 is received. The nuts 44 secure the assembly to the bracket and provide the abutments for the forces generated when wing nut 42 is turned to draw the member 14 toward its mate and thus clamp the rods 20.

It is to be noted that the locking assemblies 16 will maintain the members 12 and 14 in a face-to-face relationship at all times whether or not the screws 42 are tightened. The reason for this is because the legs 40 act as guides and prevent any relative twisting or turning between the members 12 and 14. The tightly fitting spring 34 also aids in this function.

In operation, the bracket is brought to the unclamped condition by loosening the screws 42 and thus allowing the spring 34 to push the members apart. The ridge poles 20 are inserted into the ends of the tube 18 until the slots 28 are engaged by the lugs 30 and 30'. Because of the tubular portions on either side of the cut-out sections in the member 12, the poles 20 will be adequately supported until clamped by the web 36 of the member 14. Next the rib pole or other pole element is inserted into the channels formed by the facing grooves 26 and 26'. When a rib pole is inserted on one side, the opposite side of the bracket will remain open, no matter how strong the downward pressure of the rib pole and its protective cover (if any). This is possible because of the interfitting relation of the tube 20, notches 28, lugs 30, 30', assembly 38 and members 12, 14. With all the poles in their proper places, they are clamped by tightening screws 42.

Figure 7:
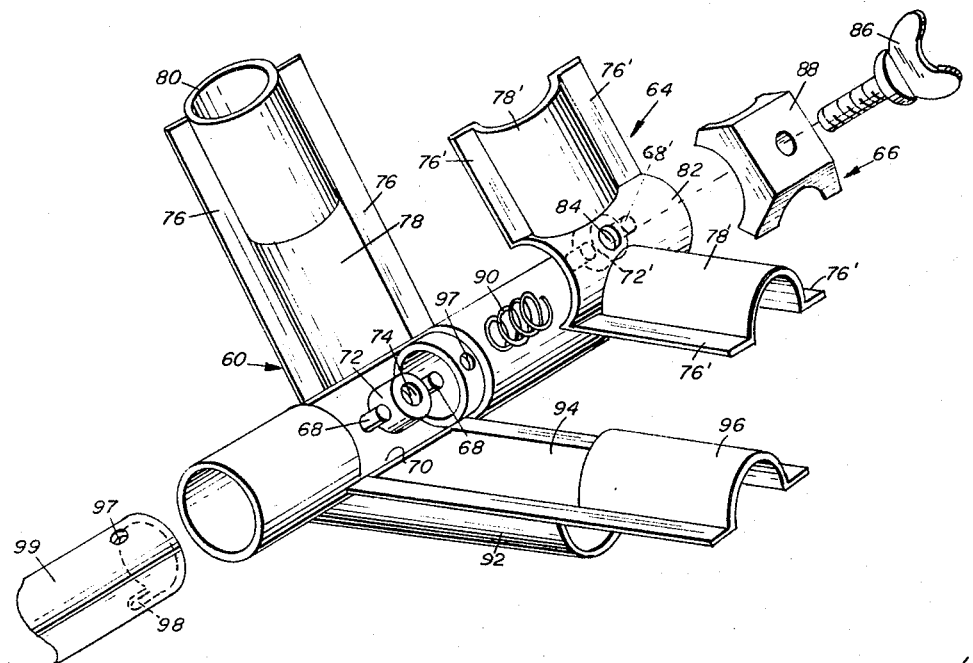
FIGURE 7 is an exploded view of a modification of the bracket in an inverted position.
Figure 3:
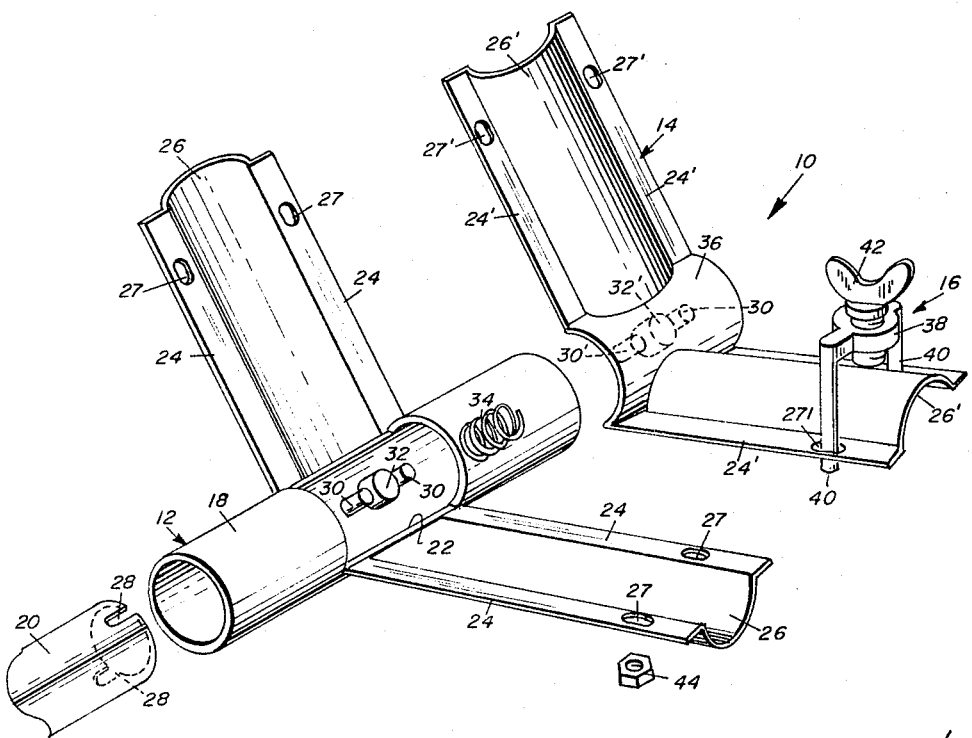
FIGURE 3 is an exploded view of the bracket in an inverted position.

A modification of the invention is shown in FIGURES 7 to 10. The bracket is generally indicated at 60 and is comprised by the base member 62, a complementary member 64, and a single locking assembly 66. The member 62 has a pair of lugs 68 opposite a cut-out portion 70. A boss 72, having a central threaded opening 74, is provided between the lugs 68. This bracket has two different types of flanges 76 and 92 extending from member 62. However, in its commercial embodiment the flanges would be identical with one another and the disparity shown is for illustrative purposes.

The flange 76 extending from one side of the cut-out portion has a groove 78 and is provided with a tubular guide 80 at its free end. The other flange 92 has a groove 94 and is provided with a semi-cylindrical guide 96 at its outer end. The semi-cylindrical portion which forms the groove 94 is located on the inner portion of the flange and terminates before the semi-cylindrical guide 96, which is on the outer portion of the flange, begins. The unusual construction of flange 92 makes it extremely easy to insert a rod into the bracket.

The complementary member or plate 64 has flanges 76' which are short enough to fit against the portion of the flanges 76 between the guides 80 and 96 and the member 62. The flanges 76' are provided with grooves 78' and a curved central web 82 has an aperture 84.

The locking assembly 66 is comprised of a wing bolt 86 and a nut 88 having a bottom portion curved to conform to the curvature of the web 82 and the outer wall of the grooves 78'. The bolt 86 is engaged with the pressure nut 88 and passes through the aperture 84 into engagement with the threaded opening 74. A spring 90 is provided on the bolt around the boss 72 and around boss 72' to bias the member 64 outwardly when the bolt 86 is loosened in the opening 74. Spring 90 also maintains member 64 in the proper position when the bracket is loosened. Slot 98 engages with lug 68 and prevents rotation of tube 99. Aperture 97 engages with lug 68' when member 64 is secured so that tube 99 is positively locked to the bracket no matter how much yanking or pulling is exerted thereon. There is a gap 102 between 96 and 64 that allows tube 99 to catch under 92 as it is inserted into the bracket from a higher angle.

In this modification, the pole elements are assembled as before and the bolt 86 is tightened to clampingly engage them against the member 62. It can be seen that before clamping, insertion of a rib pole is facilitated by flange 92 since axial alignment of the pole and the flange is not necessary whereas with the flange 76 it is.

In summary, the brackets described in both embodiments provide an easy and efficient structure for assembling a plurality of unyieldy pole elements.

The locking means in conjunction with the spring means permits rapid assembly and disassembly of the pole elements without altering the basic and necessary face-to-face relationship between the clamping members.

What has been set forth above is intended primarily as exemplary to enable those skilled in the art in the practice of the invention and it should therefore be understood that, within the scope of the appended claims, the invention may be practiced in other ways than as specifically described.

What is new and therefore desired to be protected by Letters Patent of the United States is:

1. A bracket for securely supporting opposed first poles and simultaneously securely supporting opposed second poles disposed transversely to said first poles comprising, a tube receiving said first poles, said tube having a cut-out portion intermediate its ends, a first flange extending transversely outwardly from one side of said cut-out portion, a second flange extending transversely outwardly from the opposite side of said cut-out portion, said first and second flanges having a groove receiving said second poles, a plate disposed over said first and second flanges and said cut-out portion and having a plurality of intersecting grooves having mirror image concave surfaces disposed opposite to and corresponding with the concave surfaces of said tube cut-out portion and said first and second flange grooves, whereby when said tube and said plate are juxtaposed in face-to-face relation, channels are formed which receive said first poles and said second poles; spring means extending through said cut-out portion for biasing said members away from each other, and locking means for overcoming said bias and maintaining said members in a secured face-to-face relationship.

2. The invention as described in claim 1 wherein said locking means comprises screw means located at the outer ends of said opopsed flanges for clamping them together.

3. The invention as described in claim 1 wherein said first and second flanges are provided with tubular guides at their outer ends.

4. The invention as described in claim 3 wherein said locking means comprises screw means extending through said plate and said cut-out portion for clamping together said tube and said plate.

5. The invention as described in claim 1 wherein said first and second flanges are provided with semi-cylindrical guides at their outer ends.

6. The invention as described in claim 1 wherein said poles have openings and said grooves have projections for engaging said openings to prevent relative twisting and turning between said members and said poles.

References Cited
UNITED STATES PATENTS

| | | | |
|---|---|---|---|
| 567,009 | 9/1896 | Slyder | 135—7.1 |
| 1,310,638 | 7/1919 | Summers | 287—540 |
| 2,243,687 | 5/1941 | Sutherland | 287—540 |
| 2,284,686 | 6/1942 | Rupright | 135—4 |
| 2,804,083 | 8/1957 | Wieber | 135—4 |
| 3,303,851 | 2/1967 | Grunfeld | 135—7.1 |

CARL W. TOMLIN, *Primary Examiner.*

W. L. SHEDD, *Assistant Examiner.*